(12) United States Patent
Strasser

(10) Patent No.: US 7,400,990 B2
(45) Date of Patent: Jul. 15, 2008

(54) METHOD FOR PERFORMING A FUNCTION TEST OF A POSITION MEASURING SYSTEM AND POSITION MEASURING SYSTEM FOR EXECUTING THE METHOD

(75) Inventor: Erich Strasser, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 11/312,794

(22) Filed: Dec. 20, 2005

(65) Prior Publication Data
US 2006/0136159 A1   Jun. 22, 2006

(30) Foreign Application Priority Data
Dec. 22, 2004   (DE) .................. 10 2004 063 230

(51) Int. Cl.
*G01P 21/00* (2006.01)
(52) U.S. Cl. ................. 702/94; 702/150; 73/1.79; 33/702
(58) Field of Classification Search ............... None
See application file for complete search history.

(56) References Cited
U.S. PATENT DOCUMENTS
5,740,081 A * 4/1998 Suzuki .................. 702/94

OTHER PUBLICATIONS
Ernst, Alfons, "Digitale Längen—und Winkelmesstechik" [Digital Longitudinal and Angle Measuring Technology], published by Moderne Industrie, 1989, pp. 1-94.
Ernst, Alfons, Digital Linear and Angular Metrology, published by Moderne Industrie, 1989, pp. 1-94.

* cited by examiner

Primary Examiner—Manuel L Barbee
(74) Attorney, Agent, or Firm—Brinks Hofer Gilson & Lione

(57) ABSTRACT

A method for performing a functional test of a position measuring system, which in the course of scanning a scale by a position measuring unit generates position values. The method includes generating a control value in the position measuring system, the control value having a defined mathematical interrelationship with one of the position values and into which a correction value stored in the position measuring system is entered as a parameter. Transmitting the control value and an associated position value to an evaluation unit located downstream of the position measuring system. Making a check in the evaluation unit to determine whether there is a mathematical interrelationship between the control value and the associated position value. Storing the correction value in the position measuring system under a first memory address and a second memory address. Accessing the correction value at the first memory address for forming a definite mathematical interrelationship between the control value and the associated position value, wherein the making a check includes having the evaluation unit access the correction value at the second memory address.

20 Claims, 1 Drawing Sheet

US 7,400,990 B2

METHOD FOR PERFORMING A FUNCTION TEST OF A POSITION MEASURING SYSTEM AND POSITION MEASURING SYSTEM FOR EXECUTING THE METHOD

Applicant claims, under 35 U.S.C. § 119, the benefit of priority of the filing date of Dec. 22, 2004 of a German patent application, copy attached, Serial Number 10 2004 063 230.8, filed on the aforementioned date, the entire contents of which is incorporated herein by reference.

BACKGROUND OF THE INVENTION

1. Field of the Invention

The present invention relates to a method for performing a functional test of a position measuring system, which in the course of scanning a scale by a position measuring unit generates position values, and to a position measuring system for executing the method.

2. Discussion of Related Art

A position measuring system includes a position detection unit for the generation of positional data words, which are fed to a processing unit of the position measuring system and from which position values are generated in the processing unit. Here, the generation of the positional data words by means of a position detection unit takes place by scanning, for example optical scanning, of a scale (measuring graduation) by a measuring transducer device of the position detection unit during a relative movement of the position detection unit with respect to the scale. If, for example, the measuring transducer device is operated in a known manner in accordance with a magnetic or optical scanning principle, it includes magnetic detectors or optical detectors (photo-detectors), which in the course of scanning the associated scale (measuring graduation) generate electrical signals, which are passed on to the processing unit in the form of digital positional data words for generating position values.

By arranging the position detection unit, on the one hand, and the scale on the other, respectively on two objects which are movable with respect to each other, for example in the form of machine elements of a machine tool, it is possible to detect the respective position of the one object in relation to the other object, and this, as a function of the type of the scale, either in the form of an absolute position (when using a scale formed by a code track), or in the form of relative position changes (when using an incremental periodic measuring graduation of the scale). The position measuring system can be designed for longitudinal measurements, on the one hand or, on the other for angle measurements, depending on the type of the movement of the two objects in relation to each other.

To assure that the position values generated from the positional data words in the processing unit, which are to be passed on for evaluation to an evaluation unit (electronic follow-up device) arranged downstream of the position measuring system, are not distorted because of electronic malfunctions or interferences, a functional test is performed in the course of position measuring in that at least one control value is generated in the position measuring system in addition to the position values, which has a specific mathematical interrelationship with one of the position values, wherein a correction factor is introduced into this mathematical interrelationship, which is stored in a memory of the position measuring system.

The control value, together with the position values, is transmitted to the evaluation unit (electronic follow-up device) arranged downstream of the position measuring system, which can be, for example, a component of a machine control device, which controls a machine tool as a function of the position values generated in the position measuring system. For this purpose it is possible in connection with the evaluation unit and, in some applications even with the position measuring system itself, to form values composed of or derived from several individual position values such as, for example, speed values as a change of the individual position values over time, and acceleration values as a change of the individual speed values over time. In this case the term "position values" is also intended to include the values respectively composed of or derived from several individual position values, such as speed, acceleration and jolts. However, the main field of application is the transmission of individual position values in the narrower sense from the position measuring system to the evaluation unit, so that then possibly further values, such as speed and acceleration, for example, can be formed from them, which are required for the control or regulation of a machine.

A check is also made in the evaluation unit (electronic follow-up device) whether the expected mathematical interrelationship exists between the control value and the associated position value, and this is done by using the correction value stored in the memory of the position measuring system, which is transmitted to the electronic follow-up device for this purpose. Thus, the position values generated in a position measuring system, for example, are regularly charged with an offset in the form of a so-called zero point shift before the respective position value is passed on to the electronic follow-up device. By this it is possible to create a definite reference position (a so-called zero position) for every type of the arrangement of the position measuring system on the machine tool or the like. As a rule, a suitable zero point shift is defined in the course of the initial start-up of a position measuring system.

Besides the position values charged with the zero point shift, second position values, called control values, which are not charged with the zero point shift and each of which relates to the same measured position value (i.e. the same positional data word) as each (actual) position value charged with the zero point shift, can be created in the position measuring system. In this case the respective control value and the associated position value are preferably generated independently of each other.

By transmitting the position values charged with the zero point shift, as well as the control values not charged with the zero point shift, to an electronic follow-up device arranged downstream of the position measuring system, it is possible to perform there a comparison between the individual position values and a respectively associated (i.e. not related to the same positional data word generated by the measuring transducer device) control value. By comparing control values and position values which are associated with each other in the electronic follow-up device it is possible to check whether the expected mathematical interrelationship exists between them, and this while using the correction value introduced into this mathematical interrelationship, which is read out of the memory of the position measuring system for this purpose.

However, in the course of this functional test it is not possible to detect those errors which are based on a hardware defect of certain memory cells of the memory of the position measuring system. A distortion of the correction value because of a hardware defect in the memory of the position measuring system has the same effect on the generation of the control value in the position measuring system as during the subsequent check of the mathematical interrelationship between a position value and the associated control value in the downstream arranged electronic follow-up device.

SUMMARY OF THE INVENTION

The present invention is therefore based at least in part on the object of further improving a method for a functional check of a position measuring system of the type mentioned at the outset in regard to its dependability.

In accordance with the present invention, this object is attained by creating a method for performing a functional test of a position measuring system, which in the course of scanning a scale by a position measuring unit generates position values. The method includes generating a control value in the position measuring system, the control value having a defined mathematical interrelationship with one of the position values and into which a correction value stored in the position measuring system is entered as a parameter. Transmitting the control value and an associated position value to an evaluation unit located downstream of the position measuring system. Making a check in the evaluation unit to determine whether there is a mathematical interrelationship between the control value and the associated position value. Storing the correction value in the position measuring system under a first memory address and a second memory address. Accessing the correction value at the first memory address for forming a definite mathematical interrelationship between the control value and the associated position value, wherein the making a check includes having the evaluation unit access the correction value at the second memory address.

In accordance therewith the correction value is stored in the position measuring system at two different memory addresses, i.e. once in each of two different memory cells wherein, for generating the control value in the position measuring system, the correction value stored at a first memory address in the one memory cell is accessed, and in the course of checking the mathematical interrelationship between the control value and the associated position value in the electronic follow-up device, the correction value stored at the second memory address in the other memory cell is accessed.

Since as a rule a hardware defect in the memory of the position measuring system affects the correction values stored in different memory cells in different ways, with a performance in accordance with the present invention of the functional test it is possible to recognize a defect in the memory of the position measuring system in that the mathematical interrelationship with the associated position value used in the generation of the control value in the position measuring system cannot be repeated in the downstream-connected electronic follow-up device because, in the presence of a hardware defect in the memory, the control value, which respectively is entered as a parameter in the mathematical interrelationship, which is taken from different memory cells in the position measuring system, on the one hand, and on the other in the electronic follow-up device, of the memory provided for this, does not have the same value when used in the position measuring system on the one hand and, on the other in the electronic follow-up device, because of being read out of different memory cells.

In this case the two memory addresses, under which on the one hand the correction value employed in the generation of the position values, or control values and, on the other hand, the identical correction value used by the electronic follow-up device for checking the mathematical interrelationship between the control value and the associated position value is stored, can be parts of the same memory unit, i.e. be stored in two different memory cells of the same data memory, wherein the associated memory addresses identify each one of these memory cells. This is preferably a non-volatile memory (EEPROM).

The mathematical interrelationship between a position value and the respectively associated control value can be formed in a simple manner by an offset, i.e. the position value and the associated control value differ by an additive parameter, for example the above mentioned zero point shift.

A position measuring arrangement by which the method in accordance with the present invention can be executed includes a position detection unit and a processing unit that is in communication with the position detection unit, the processing unit generates a position value and a control value in the course of scanning a scale, wherein the control value has a definite mathematical interrelationship with respect to the position value. A memory unit for storing a correction value, which is entered in the form of a parameter into the mathematical interrelationship between the position value and the control value. An evaluation unit connected downstream of the position measuring system for checking the mathematical interrelationship between the position value and the control value. The correction value is stored in the memory unit under a first memory address and a second memory address so that, for forming a definite mathematical interrelationship between the control value and the correction value, the position measuring system accesses the correction value at the first memory address and, in the course of checking for the presence of the mathematical interrelationship between the control value and the associated position value, the evaluation unit accesses the correction value at the second memory address.

Further details and advantages of the present invention will become apparent from the subsequent description of an exemplary embodiment by the drawing figure.

DETAILED DESCRIPTION OF THE PREFERRED EMBODIMENTS

Figure 1:
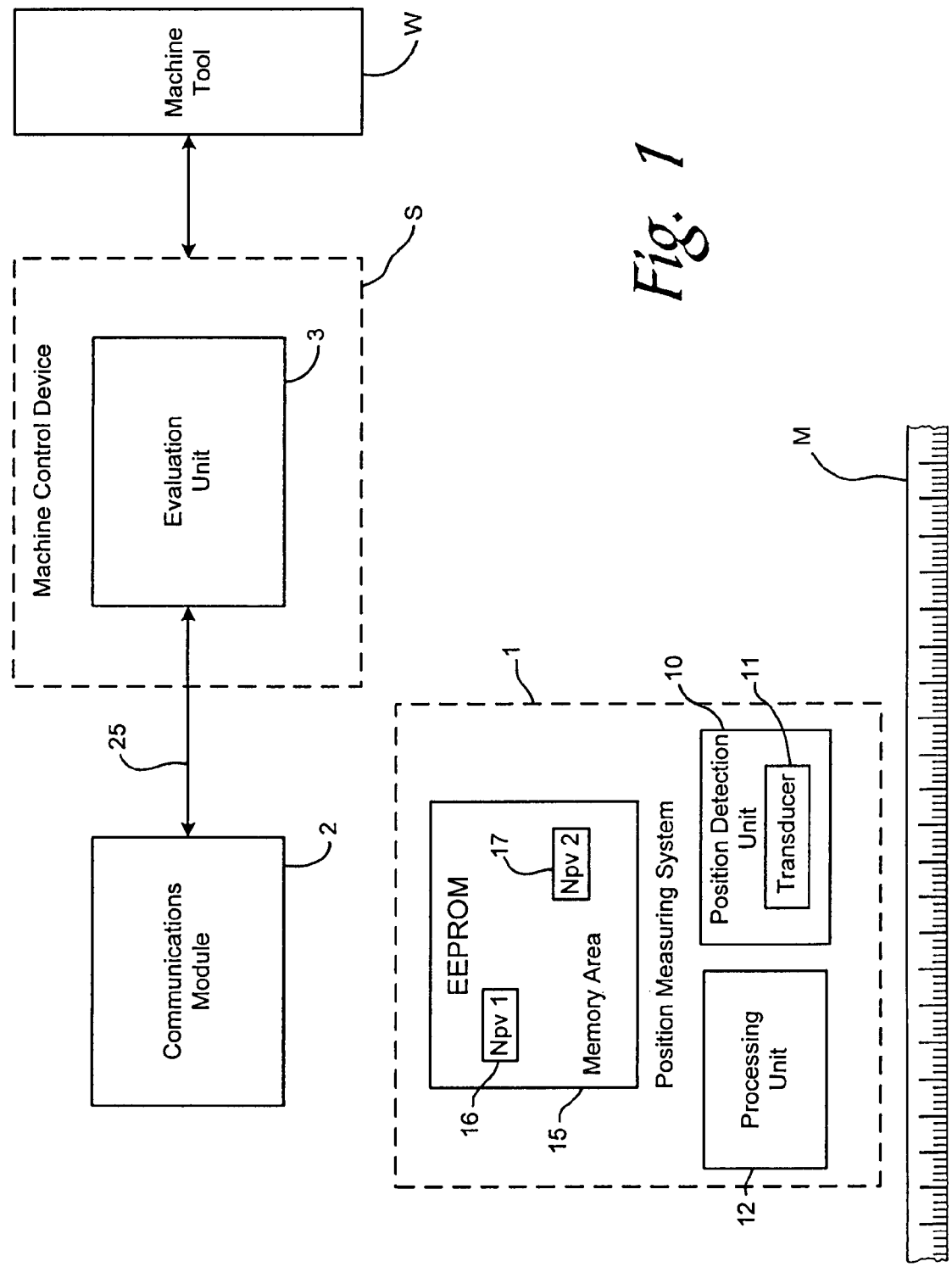
FIG. 1 schematically shows an embodiment of a position measuring system which is connected via an embodiment of a communications module and an embodiment of an interface connected downstream of it with an embodiment of an electronic follow-up device in accordance with the present invention.

As shown in FIG. 1, position measuring system 1 includes a position detection unit 10 with a measuring transducer 11 which, for scanning a scale (measuring graduation M), is designed in accordance with a magnetic, optical or other suitable principle and which, in the course of scanning the measuring graduation M, generates (digital) measured values, which represent the spatial position of the position detection unit (10) in relation to the associated measuring graduation M.

The position measuring system 1 furthermore has a processing unit 12, in which position values are generated from signals (positional data words) of the measuring transducer 11 of the position detection unit 10 in the course of scanning an associated measuring graduation M, which identify the spatial position of the measuring transducer in relation to the associated measuring graduation M. Moreover, the position measuring system 1 has a memory area 15, in which inter alia values of a zero point shift Npv are stored, which are used for generating the position values.

Further than the above mentioned components 10, 11, 12, 15, a position measuring system customarily contains further electronic components which, however, will not be discussed in the course of the following description of a functional test of the position measuring system. Regarding further details of the structure of a position measuring system, reference is made to the manual by Alfons Ernst, "Digitale Längen-und Winkelmesstechik" [Digital Longitudinal and Angle Measuring Technology], Moderne Industrie, publishers, (1989).

In the course of a position measurement, i.e. scanning of an associated measuring graduation by the measuring transducer 11, wherein the measuring graduation on the one hand and the position detection unit 10 on the other hand are arranged on respectively two objects which are movable with respect to each other, positional data words are generated, from which position values are generated in the processing unit 12. In the course of their generation from positional data words, the individual position values are each charged adaptively with a defined offset in the form of a zero point shift, which had been determined in the course of the start-up of the position measuring system 1 and stored in the memory areas 15.

In this case the zero point shift Npv is stored here under two different addresses in the memory area 15, i.e. in two different memory cells 16, 17, so that the same zero point shift Npv can be selectively called up from one of two different memory addresses, or read out from one of two different memory cells 16, 17. In what follows, the zero point shift which can be read out from the one memory cell 16 will be identified as Npv1, and the zero point shift which can be read out from the other memory cell 17 as Npv2. The values Npv1 and Npv2 are per se identical, since they represent the same zero point shift, however, in case of a defect of the memory area 15 they can also assume different values, which makes the detection of such a defect possible.

In addition to the position values charged with the zero point shift, control values are also generated in the position measuring system 1, which are assigned to each one of the position values and differ therefrom in that they are not charged with the zero point shift. Expressed in other words, respectively one position value additively charged with the zero point shift, as well as a control value not charged with the zero point shift, are generated independently of each other in the position measuring system 1 from a positional data word generated by the measuring transducer 11. Thus, there is a definite mathematical interrelationship between a position value and the respectively assigned control value, namely a (constant) offset provided by the zero point shift, so that the difference between a respective position value P and an associated control value K is equal to the zero point shift Npv, i.e. P−K =Npv, wherein Npv represents the value of the zero point shift independently of the type of its storage in the memory unit 15. In this case the zero point shift Npv1, which can be called up from a first memory cell under a first memory address 16, but can possibly be distorted by a hardware defect of the memory unit 15, is accessed in the position measuring system 1 for charging the position values with the zero point interrelationship.

The position values generated in the position measuring system 1 in the above described manner, as well as the control values assigned to individual position values, which differ from the former by a constant offset in the form of a zero point shift Npv 1, are sequentially transmitted via a communications module 2, as well as an interface 25 assigned to the position measuring system 1, to an electronic follow- up device or evaluation unit 3, which constitutes a component of a machine control device 5, in which the position values are evaluated for controlling a machine tool W. Note that the position measuring system 1, communications module 2, interface 25. the machine control device S and machine tool W can be considered to define a position measuring arrangement.

A functional test is performed in the electronic follow-up device 3 in order to test the correct generation of the position values in the position measuring system 1, as well as a correct transmission of the position values via the communications module 2 and the interface 25 to the electronic follow-up device. A test for this is performed in the electronic follow-up device 3 to determine whether the expected, preset mathematical interrelationship exists between a position value and the respectively assigned control value, in this case a constant offset in the form of a zero point shift. To check for this mathematical interrelationship, the difference between a respective position value and the associated control value is formed in the electronic follow-up device and a query is made whether this difference corresponds to the expected offset. For this purpose, the zero point shift Npv1 stored under the first memory address in a first memory cell 16 of the memory area 15 is not used as the offset, but the zero point shift Npv2 stored in another memory cell 17 of the memory area 15 under a different memory address instead. For this purpose, the latter can be read out of the memory area 15 by the electronic follow-up device 3 when the position measuring system 1 is switched on. Thus, a check is made in the electronic follow-up device 3 whether P−K=Npv2.

If the difference between a position value and the associated control value determined in the electronic follow-up device 3 does not correspond to the expected offset, i.e. not to the zero point shift Npv2, this indicates an error in the generation of the position values in the position measuring system 1, or in the transmission of the position values from the position measuring system 1 to the electronic follow-up device 3. In the course of this those errors are also detected which lead to a distortion of the zero point shift Npv1 used in the generation of the position values, i.e. a hardware defect in the memory area 15, for example, in that for checking the expected mathematical interrelationship between a respective position value and the associated control value, a value Npv2 had been used for the identical zero point shift in the electronic follow-up device 3, which had been stored in another memory cell 17 of the memory area 15. A hardware defect which results in a distortion of the contents of the memory cells of the memory area 15 will, as a rule, not have the identical effect on all memory cells in the memory area 15.

The foregoing description is provided to illustrate the invention, and is not to be construed as a limitation. Numerous additions, substitutions and other changes can be made to the invention without departing from its scope as set forth in the appended claims.

I claim:

1. A method for performing a functional test of a position measuring system, which in the course of scanning a scale by a position measuring unit generates position values, the method comprising:

generating position values by having a position measuring unit scan a scale;

generating a control value in said position measuring system, said control value having a definite mathematical interrelationship with one of said position values;

transmitting said control value and an associated position value to an evaluation unit located downstream of said position measuring system;

making a check in said evaluation unit to determine whether there is a mathematical interrelationship between said control value and said associated position value;

storing a correction value in said position measuring system under a first memory address and a second memory address;

accessing said correction value at said first memory address for forming said definite mathematical interrelationship between said control value and said associated position value, wherein said making a check comprises having said evaluation unit access said correction value at said second memory address; and evaluating said position values and controlling a machine tool based on said evaluating.

2. The method in accordance with claim 1, wherein said control value and said associated position value are generated independently of each other in said position measuring system from a positional data word generated by a measuring transducer of said position measuring system while scanning an associated scale.

3. The method in accordance with claim 1, wherein said first memory address and said second memory address are assigned to separate memory cells of a memory unit.

4. The method in accordance with claim 3, wherein said memory unit is a non-volatile memory.

5. The method in accordance with claim 1, further comprising transmitting said correction value stored at said second memory address to said evaluation unit when said position measuring system is started.

6. The method in accordance with claim 1, wherein said control value and said associated position value differ by an additive value, which is determined by said correction value.

7. The method in accordance with claim 6, wherein said correction value represents a zero point shift of said position values.

8. The method in accordance with claim 1, wherein said evaluation unit is a component of a control device, which evaluates said position values for generating control signals.

9. The method in accordance with claim 8, wherein said control device is used for controlling a machine tool.

10. The method in accordance with claim 1, wherein said definite mathematical interrelationship is a linear relationship.

11. The method in accordance with claim 1, wherein said definite mathematical interrelationship is such that a difference between said one of said position values and said control value is equal to a constant.

12. The method in accordance with claim 11, wherein said constant is a zero point shift.

13. A position measuring arrangement comprising:

a position measuring system comprising:

a position detection unit;

a processing unit that is in communication with said position detection unit, said processing unit generates a position value and a control value in the course of scanning a scale, wherein said control value has a mathematical interrelationship with respect to said position value;

a memory unit for storing a correction value, which is entered in the form of a parameter into said mathematical interrelationship between said position value and said control value; and an evaluation unit connected downstream of said position measuring system for checking said mathematical interrelationship between said position value and said control value;

wherein said correction value is stored in said memory unit under a first memory address and a second memory address so that, for forming said mathematical interrelationship between said control value and said position value, said position measuring system accesses said correction value at said first memory address and, in the course of checking for the presence of said mathematical interrelationship between said control value and said position value, said evaluation unit accesses said correction value at said second memory address.

14. The position measuring arrangement in accordance with claim 13, wherein said first memory address and said second memory address point to a first memory cell and a second memory cell, respectively, of said memory unit.

15. The position measuring arrangement in accordance with claim 14, wherein said memory unit is a non-volatile memory.

16. The position measuring arrangement in accordance with claim 13, wherein said evaluation unit is a component of an electronic control device, which evaluates said position value for generating control signals.

17. The position measuring arrangement in accordance with claim 16, wherein said control device is designed and intended for controlling a machine tool.

18. The position measuring arrangement in accordance with claim 13, wherein said definite mathematical interrelationship is linear.

19. The position measuring arrangement in accordance with claim 13, wherein said definite mathematical interrelationship is such that a difference between said one of said position values and said control value is equal to a constant.

20. The position measuring arrangement in accordance with claim 19, wherein said constant is a zero point shift.

* * * * *